(No Model.)

C. D. R. PERKINS.
STREET SPRINKLER.

No. 307,983. Patented Nov. 11, 1884.

Witnesses.

Chas. D. R. Perkins, Inventor
By atty,

UNITED STATES PATENT OFFICE.

CHARLES D. R. PERKINS, OF NEW HAVEN, CONNECTICUT, ASSIGNOR OF ONE-HALF TO LEVI DORMAN, OF SAME PLACE.

STREET-SPRINKLER.

SPECIFICATION forming part of Letters Patent No. 307,983, dated November 11, 1884.

Application filed April 28, 1884. (No model.)

*To all whom it may concern:*

Be it known that I, CHARLES D. R. PERKINS, of New Haven, in the county of New Haven and State of Connecticut, have invented a new Improvement in Street-Sprinklers; and I do hereby declare the following, when taken in connection with accompanying drawings and the letters of reference marked thereon, to be a full, clear, and exact description of the same, and which said drawings constitute part of this specification, and represent, in—

Figure 1:
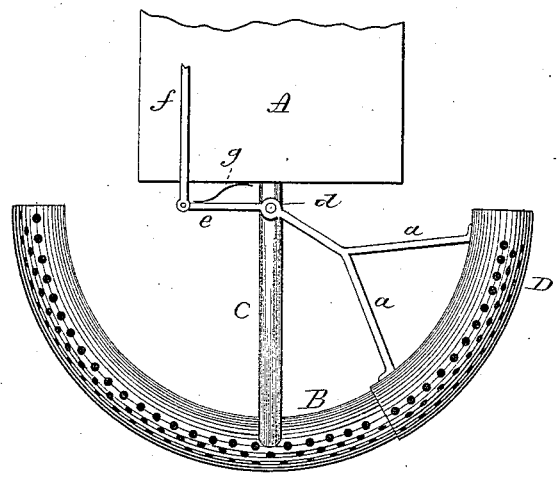
Figure 3:
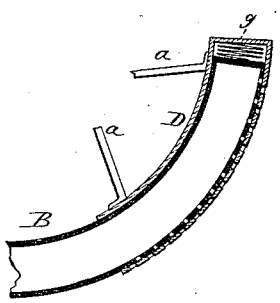
Figure 2:
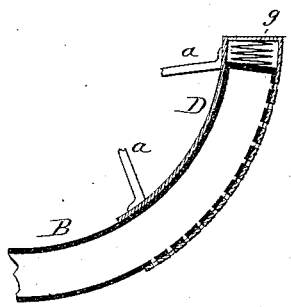

Figure 1, a top view of the distributer and so much of the tank as is necessary to show its connection; Figs. 2 and 3, horizontal sections of the distributer, showing the sleeve in its two extreme positions.

This invention relates to an improvement in that class of street-sprinklers which consist of a tank arranged upon wheels, so as to be drawn through the streets, with a perforated distributer at the rear in a horizontal plane, to which the water is led from the tank controlled by suitable gates, so as to cut off or admit the supply. The supply, entering the distributer, flows through the perforations. These distributers are usually made segment-shaped, so as to distribute the water over a large surface.

In passing through streets where carriages are standing at the sides, it is desirable to avoid throwing the water upon those carriages. To accomplish this object the distributers have been constructed with different apartments, one or more of which might be cut off at the pleasure of the driver, so that through the part cut off there would be no sprinkling or distribution of water. The devices for cutting off this supply have necessitated divisions or partitions in the distributer, with valves arranged so that one or more of these apartments might be cut off from the tank. Again, it frequently occurs that the distributer will discharge more water than is desirable. To reduce this quantity of discharge, more or less of the holes are plugged.

The object of my invention is to avoid the divisions of the distributer, as well as to regulate, vary, or adjust the size of the perforations; and it consists in the construction hereinafter described, and more particularly pointed out in the claim.

A represents the tank arranged upon wheels in the usual manner; B, the distributer, which consists of a segment-shaped tube perforated, with one or more tubes, C, leading from the tank thereto. As it is only desirable to cut off either one side or the other, I arrange upon the end portion of the distributer a surrounding sleeve, D, movable on the segment in the direction of its circumference, and perforated corresponding to the perforations in the segment, and so that if the sleeve stand with its perforations registering with the perforations in the segment, then the water will flow through the perforations as if the sleeve were not present; but if the sleeve be moved so as to take its perforations from over the perforations of the distributer, then the perforations in the distributer are closed by the sleeve, and no water will escape, as seen in Fig. 3; or if the sleeve be moved so as to partially cover the perforations in the segment, then the amount of discharge will be proportionately reduced. The sleeve should be arranged so as to be operated by the driver on the tank. To this end arms $a$ extend to a hub, $d$, hung upon a center corresponding to the center of the segment, and from this hub an arm, $e$, extends to one side, and from this arm a rod, $f$, extends to a convenient position near the driver's seat, where he can by his hand or foot turn the arm $e$, and thereby throw the sleeve into its registering position, cut it off entirely, or regulate it as circumstances may require. As the normal condition of the distributer is open, a spring, $g$, is arranged to force the sleeve into the registering position, and this is best made by the introduction, say, of a helical spring, as seen in Figs. 2 and 3, at the outer end of the segment, to bear against the head of the sleeve, the spring being compressed as the sleeve is turned from the position seen in Fig. 2 to that in Fig. 3; then the reaction of the spring will return the sleeve.

Instead of the helical spring and arranged as described, the spring $g$ may be applied as seen in Fig. 1. By this construction the usual divisions of the segment are avoided, as also the multiplication of valves, traps, and openings for the purpose of cleaning out the segment. The only cleaning-openings necessary are at the ends of the segments.

I claim—

The herein-described improvement in street-sprinklers, consisting of the segment-shaped perforated distributer, to which the water is conducted from the tank, combined with one or more sleeves arranged to move thereon in the direction of the circumference of the segment, perforated corresponding to the perforations in that part of the distributer over which the sleeve is arranged, and whereby the perforations in the distributer may be wholly cut off, or opened, or partially opened, with a spring to return the sleeve after it shall have been mechanically moved in one direction, substantially as described.

CHARLES D. R. PERKINS.

Witnesses:
JOHN E. EARLE,
JOS. C. EARLE.